(12) United States Patent
Lee et al.

(10) Patent No.: US 12,104,682 B2
(45) Date of Patent: Oct. 1, 2024

(54) HYDRAULIC SYSTEM AND CONTROL LOGIC FOR TORQUE CONVERTER ASSEMBLIES

(71) Applicant: GM GLOBAL TECHNOLOGY OPERATIONS LLC, Detroit, MI (US)

(72) Inventors: Chunhao J. Lee, Troy, MI (US); Norman K. Bucknor, Troy, MI (US); Dongxu Li, Troy, MI (US); Chengwu Duan, Shanghai (CN); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 440 days.

(21) Appl. No.: 17/560,577

(22) Filed: Dec. 23, 2021

(65) Prior Publication Data

US 2023/0167887 A1 Jun. 1, 2023

(30) Foreign Application Priority Data

Nov. 30, 2021 (CN) .......................... 202111441093.8

(51) Int. Cl.
*F16H 45/02* (2006.01)
*B60K 1/00* (2006.01)
(Continued)

(52) U.S. Cl.
CPC .............. *F16H 45/02* (2013.01); *B60K 1/00* (2013.01); *B60K 17/02* (2013.01); *B60K 17/06* (2013.01);
(Continued)

(58) Field of Classification Search
CPC ...... F16H 45/02–2045/0294; F16H 2045/002; F16H 61/00–2061/0053;
(Continued)

(56) References Cited

U.S. PATENT DOCUMENTS 4,889,012 A 12/1989 Dull
6,126,568 A 10/2000 Sudau
(Continued)

FOREIGN PATENT DOCUMENTS

DE 102007023481 A1 1/2008
DE 102008024276 A1 1/2009
(Continued)

*Primary Examiner* — Ernesto A Suarez
*Assistant Examiner* — Lillian T Nguyen
(74) *Attorney, Agent, or Firm* — Quinn IP Law

(57) ABSTRACT

Presented are torque converters (TC) with hydraulic systems for converter feed and clutch control, methods for making/operating such TC assemblies, and vehicles equipped with such TC assemblies. A TC assembly includes a housing that drivingly connects to an electric motor, and an output member that drivingly connects to a multi-gear transmission. Rotatable within the TC housing are a turbine attached to the TC output member and an impeller juxtaposed with the turbine. A lockup clutch disposed inside the TC housing, between the turbine and housing, is operable to lock the housing to the output member. A disconnect clutch disposed inside the housing, between the impeller and housing, is operable to lock the housing to the impeller. A pump is attached to the TC housing and drivingly connected to the motor for feeding fluid into the housing to increase pressure within the TC chamber and activate the lockup and disconnect clutches.

20 Claims, 4 Drawing Sheets

(51) Int. Cl.
*B60K 17/02* (2006.01)
*B60K 17/06* (2006.01)
*F16H 57/02* (2012.01)

(52) U.S. Cl.
CPC ..... *F16H 57/02* (2013.01); *F16H 2045/0273* (2013.01); *F16H 2057/02034* (2013.01)

(58) Field of Classification Search
CPC ........ F16H 61/14–143; F16H 61/0031; B60W 10/024–026
See application file for complete search history.

(56) References Cited

U.S. PATENT DOCUMENTS

| | | | |
|---|---|---|---|
| 9,333,974 B1* | 5/2016 | Gibson | ................ B60W 10/06 |
| 9,394,981 B2 | 7/2016 | Lindemann et al. | |
| 9,856,958 B2 | 1/2018 | Basin et al. | |
| 10,006,517 B2 | 6/2018 | Li et al. | |
| 10,288,159 B2 | 5/2019 | Li et al. | |
| 10,293,674 B1 | 5/2019 | Wilton | |
| 10,337,597 B2 | 7/2019 | Samie et al. | |
| 10,576,837 B2 | 3/2020 | Li et al. | |
| 10,974,593 B2 | 4/2021 | Duan et al. | |
| 11,009,124 B2 | 5/2021 | Li et al. | |
| 11,603,925 B1* | 3/2023 | Lee | .......... F16H 61/14 |
| 2008/0227597 A1 | 9/2008 | Povirk et al. | |
| 2010/0105519 A1 | 4/2010 | Kasuya | |
| 2010/0273603 A1 | 10/2010 | Roses et al. | |
| 2011/0114433 A1* | 5/2011 | Hattori | .................... F16H 45/02 192/3.29 |
| 2012/0247902 A1* | 10/2012 | Moorman | ........... F16H 61/0206 74/473.11 |
| 2013/0310216 A1* | 11/2013 | Kamiya | .................. F16D 25/10 903/902 |
| 2014/0251744 A1 | 9/2014 | Steinberger et al. | |
| 2016/0017933 A1 | 1/2016 | Nedorezov | |
| 2018/0149263 A1 | 5/2018 | Nagasato et al. | |
| 2018/0172127 A1* | 6/2018 | Depraete | ................ F16H 45/02 |
| 2019/0168731 A1 | 6/2019 | Lee et al. | |
| 2019/0211920 A1* | 7/2019 | Kidachi | ................ F16H 61/143 |
| 2020/0070651 A1* | 3/2020 | Duan | ..................... B60K 17/12 |
| 2020/0158232 A1* | 5/2020 | Payne | ................ F16H 61/4043 |

FOREIGN PATENT DOCUMENTS

| | | |
|---|---|---|
| DE | 102011109667 A1 | 2/2013 |
| GB | 2193766 A | 2/1988 |
| JP | 2001082204 A | 3/2001 |
| JP | 2009001125 A | 1/2009 |
| JP | 2010083230 A | 4/2010 |

\* cited by examiner

HYDRAULIC SYSTEM AND CONTROL LOGIC FOR TORQUE CONVERTER ASSEMBLIES

CLAIM OF PRIORITY AND CROSS-REFERENCE TO RELATED APPLICATION

This application claims the benefit of and priority to Chinese Patent Application No. 202111441093.8, which was filed on Nov. 30, 2021, and is incorporated herein by reference in its entirety and for all purposes.

INTRODUCTION

The present disclosure relates generally to powertrain systems for transmitting torque. More specifically, aspects of this disclosure relate to hydraulic control systems with attendant logic for hydrodynamic torque converters of electrified vehicle powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Vehicle powertrains employing an automatic transmission commonly insert a hydrodynamic torque converter (TC) between the engine and the multi-speed transmission to govern the transfer of rotational power therebetween. Conventional torque converters are designed to selectively transmit power from the engine to the drivetrain system for vehicle propulsion, and to allow the crankshaft to spin without the engine stalling when the vehicle wheels and transmission gears come to a stop. Replacing the mechanical clutch of a manual transmission, a standard torque converter acts as a fluid coupling with an impeller that is drivingly connected to the engine's crankshaft, and a turbine that is drivingly connected to the transmission's input shaft. Interposed between the impeller and turbine is a rotating stator that regulates fluid flow between their respective fluid volumes. A hydraulic pump modulates fluid pressure within the torque converter housing to regulate the amount of rotational energy that is transferred from the impeller to the turbine. A large difference in speed between the impeller and turbine results in torque multiplication of the impeller-received torque as, for example, when the vehicle launches from idle or rest.

Most modern torque converter assemblies are equipped with an internal "lockup" clutch mechanism that is selectively engaged to rigidly connect the engine's crankshaft to the transmission's input shaft when their speeds are nearly equal, e.g., to avoid unwanted slippage and resultant efficiency losses. System "slip" occurs because the rotational speed of the impeller relative to the rotational speed of the turbine, when unlocked, are inherently different. The torque converter clutch (TCC) operates to mechanically lock the impeller at the output of the engine to the turbine at the input of the transmission so that the engine output and transmission input rotate at the same speed. Application of the TCC may be controlled by a powertrain control module (PCM) to modify clutch engaging forces under certain operating conditions, for example, during clutch-to-clutch shifts to eliminate undesired torque fluctuations and engine speed changes during transient periods when torque flow interruption is desired. A torsional isolating damper may be employed to attenuate torque-related vibrations transmitted between the engine and the transmission during TCC lockup. While conventionally employed in ICE and hybrid powertrains to govern engine torque, torque converters are now being employed within FEV powertrains so that the traction motor(s) may take advantage of the TC's torque multiplication features and driveline excitation isolation capabilities.

SUMMARY

Presented herein are torque converter assemblies with hydraulic systems for combined converter feed and clutch control, torque-transmitting powertrains equipped with such TC assemblies, methods for making and methods for using such TC assemblies, and vehicles equipped with such TC assemblies. By way of example, there are presented FEV powertrains with an electric drive unit (EDU) containing a motor/generator unit (MGU) drivingly coupled to a dedicated hydrodynamic TC assembly. The modular TC assembly incorporates a TCC-type lockup clutch and a pump disconnect clutch (PDC) device that are both packaged inside the TC's fluid volume. The PDC device is axially spaced from the lockup clutch, inserted radially between an impeller (pump) shell and a transmission-side rear (pump) cover of the TC housing. The PDC device may be a friction-type clutch that is hydraulically actuable to friction-lock the impeller shell and blades to the rear pump cover and, thus, the MGU. Along the same lines, the TCC lockup clutch may be slidable on and splined to a TC output shaft, packaged between a turbine shell and a motor-side front (turbine) cover. The TCC lockup clutch may be a discrete friction-type clutch that is separately hydraulically actuable to friction-lock the front turbine cover to the TC's output shaft/member and, thus, the multi-gear transmission. An active or passive one-way clutch (OWC) device may be drivingly interposed between the turbine shell and the TC output shaft to carry positive motor torque to the transmission during motor-only driving modes.

A motor-driven mechanical pump—be it on axis or off-axis—may be mounted on or within the EDU housing and drivingly coupled to the motor. This pump rotates with the MGU to feed hydraulic fluid for charging the TC, clutch control for the TCC and PDC, as well as thermal management and lubrication for the TC and EDU. After pedal tip-in from stop or near stop, a hydraulic clutch control strategy during EV launch may begin (e.g., at time $T_1$) with commanding the TCC to unlock/open and the PDC to lock/close. In tandem, motor speed of the MGU is ramped up to a predefined threshold motor speed for the pump to gain capacity; at this juncture, the MGU is operated in a speed control mode. Increasing motor speed causes internal TC fluid pressure to increase with a concomitant increase in turbine speed; the MGU is switched to a torque control mode (e.g., at time $T_2$). As motor speed plateaus and vehicle speed continues to accelerate, the TCC is commanded to gradually close/lock in order to smoothly close the slip gap (e.g., at time $T_3$). When the motor and transmission speeds sync, the TCC is locked (e.g., at time $T_4$).

Attendant benefits for at least some of the disclosed concepts may include torque converter hydraulic systems that provision holistic pump operation for combined converter feed, clutch control, lubrication, and cooling. Other attendant benefits may include a novel launch control strategy utilizing a lone motor-driven mechanical pump for more efficient torque generation and faster vehicle acceleration. The optional inclusion of an electric pump may offer control simplification and enable hydraulic bypass for higher motor speeds (e.g., over 9000 RPM). Further concepts may include using the TC as a heat source for improved thermal control (e.g., preconditioning the EDU in cold-start conditions). Disclosed features may also help to improve TC lockup and disconnect response times and to selectively isolate the motor from unwanted driveline excitations.

Aspects of this disclosure are directed to hydrodynamic torque converter assemblies with hydraulic systems for joint converter feed, clutch control, and lubrication. In an example, a torque converter assembly is presented that includes a TC housing that drivingly connects (e.g., via lugs and lug plate) to an output member (e.g., rotor shaft and hub) of an electric motor to receive torque generated by the motor. A TC output member (e.g., a central turbine shaft and/or transmission shaft) projects from the TC housing and drivingly connects to an input member (e.g., an input gear or shaft) of a transmission to transfer thereto motor-generated torque. Rotatably mounted within an internal fluid chamber of the TC housing is a turbine with turbine blades mounted to a turbine shell and an impeller with impeller blades mounted to an impeller shell. The turbine is juxtaposed with the impeller and mounted onto the TC output member for common rotation therewith.

Continuing with the discussion of the above example, the torque converter assembly also includes a lockup clutch that is disposed inside the internal fluid chamber, between the turbine shell and TC housing. The lockup clutch is selectively operable to lock the TC housing to the TC output member and, thus, the transmission input member for common rotation therewith. A disconnect clutch is also disposed inside the fluid chamber, between the impeller shell and TC housing. The disconnect clutch is selectively operable to lock the impeller to the TC housing and, thus, the motor output member for common rotation therewith. Fluidly coupled to the TC housing is a mechanical pump that drivingly connects to the motor's output member to be powered by the electric motor. In so doing, the pump feeds hydraulic fluid into the TC housing to increase pressure within the internal fluid chamber and to activate the lockup and disconnect clutches.

Additional aspects of this disclosure are directed to motor vehicles equipped with TC assemblies having combined converter feed and clutch control capabilities. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels, a passenger compartment, and other standard original equipment. An electric traction motor is mounted on the vehicle body and operates alone (e.g., for FEV powertrains) or in conjunction with an internal combustion engine assembly (e.g., for HEV powertrains) to drive one or more of the road wheels to thereby propel the vehicle. A multi-gear power transmission is also mounted to the vehicle body; the transmission drivingly connects the prime mover(s) to the driven road wheel(s).

Continuing with the discussion of the above example, the vehicle also includes a torque converter assembly that operatively connects the prime mover(s) to the power transmission. This TC assembly includes a TC housing that is drivingly connected to the traction motor's rotor to thereby receive torque generated by the motor. A TC output member is attached to the TC housing and drivingly connected to the transmission to thereby transfer motor torque to the transmission. A turbine, which includes turbine blades mounted to a turbine shell, is attached to the TC output member and rotatable within the TC housing's internal fluid chamber. Likewise, an impeller, which includes impeller blades mounted to an impeller shell, is juxtaposed with the turbine shell and rotatable within the fluid chamber.

For the aforementioned TC assembly, a lockup clutch is disposed inside the fluid chamber, interposed between the turbine shell and TC housing. The lockup clutch is operable to lock the TC housing to the TC output member, e.g., to rotate in unison therewith. Likewise, a disconnect clutch is disposed inside the fluid chamber, interposed between the impeller shell and TC housing. The disconnect clutch is operable to lock the TC housing to the impeller, e.g., to rotate in unison therewith. A mechanical pump, which is fluidly connected to the TC housing, is drivingly connected to the rotor to be powered by the motor. In so doing, the pump feeds hydraulic fluid into the TC housing to thereby increase pressure within the fluid chamber and activate the lockup and disconnect clutches.

Also presented herein are system control logic, closed-loop feedback control techniques, and computer-readable media (CRM) for manufacturing and/or for operating any of the disclosed torque converter assemblies, powertrains, and/or motor vehicles. In an example, a method is presented for assembling a torque converter assembly for drivingly connecting a prime mover with a transmission. This representative method includes, in any order and in any combination with any of the above and below disclosed options and features: receiving a torque converter housing configured to drivingly connect to an electric motor's output member to thereby receive torque generated by the motor; attaching a TC output member to the TC housing, the TC output member being configured to drivingly connect to a power transmission's input member to thereby transfer torque to the transmission; rotatably mounting a turbine within the fluid chamber, the turbine including turbine blades mounted to a turbine shell, the turbine shell being attached to the TC output member; rotatably mounting an impeller within the fluid chamber, the impeller including impeller blades mounted to an impeller shell, the impeller shell juxtaposed with the turbine shell; locating a lockup clutch inside the fluid chamber, between the turbine shell and the TC housing, the lockup clutch being operable to lock the TC housing to the TC output member; locating a disconnect clutch inside the fluid chamber, between the impeller shell and the TC housing, the disconnect clutch being operable to lock the TC housing to the impeller; and fluidly connecting a mechanical pump to the TC housing, the mechanical pump being configured to drivingly connect to the output member to be powered by the electric motor and to feed fluid into the TC housing to thereby increase pressure within the internal fluid chamber and activate the lockup and disconnect clutches.

For any of the disclosed vehicles, TC assemblies, and methods, a resident or remote electronic system controller may be programmed to: command the lockup clutch to open and the disconnect clutch to close substantially simultaneously with each other; command a motor speed of the electric motor to increase to at least a predefined minimum motor speed calibrated to increase a pump speed of the mechanical pump to a predefined minimum pump speed calibrated to bring the torque converter assembly to capacity; after the motor speed reaches the minimum motor speed, command the lockup clutch to progressively close to thereby reduce a slip differential between the impeller and turbine at a predefined rate; and, responsive to a turbine speed of the turbine being substantially equal to the motor speed of the electric motor, command the lockup clutch to close. For vehicular applications, e.g., in which the electric motor and transmission are part of a vehicle powertrain, the electronic controller may calculate the predefined minimum pump speed as a function of a drive torque request received from an operator of the vehicle.

For any of the disclosed vehicles, TC assemblies, and methods, an electronic system controller may be programmed to: determine if the motor speed is less than the threshold motor speed; responsive to the motor speed being less than the threshold motor speed, determine if the lockup clutch is closed; and responsive to the lockup clutch being closed, slip the lockup clutch until the slip differential between the turbine and the impeller is substantially equal to a mathematical difference between the predefined minimum pump speed and the pump speed. As a further option, an electronic system controller may be programmed to: responsive to the motor speed not being less than the threshold motor speed, determine if the lockup clutch is closed; and, responsive to the lockup clutch not being closed, coordinate control of the lockup clutch and the electric motor by: controlling a torque output of the electric motor to achieve the drive torque request received from the operator of the motor vehicle; and controlling a fluid pressure on the lockup clutch to progressively close the lockup clutch. Commanding the lockup clutch to open and the disconnect clutch to close may be in direct response to receipt of a pedal tip-in control command from the vehicle operator (e.g., a driver, an occupant, or an ADAS controller).

For any of the disclosed vehicles, TC assemblies, and methods, an electric pump fluidly may be fluidly connected to the mechanical pump and a fluid sump. The electric pump is operable to drain fluid from the mechanical pump and divert the drained fluid to the fluid sump. An electronic valve, which is fluidly connected to both the electric and mechanical pumps, is selectively actuable to fluidly connect the electric pump to the mechanical pump such that the electric pump can drain fluid from the mechanical pump. An optional one-way clutch may be interposed between the turbine shell and the TC output member. The OWC device is generally composed of a pair of coaxial races, with one race mounted to the turbine shell and one race mounted to the TC output member. Multiple torque transmitting elements are interposed between and selectively drivingly couple the coaxial races together, e.g., to transmit torque in a single direction.

For any of the disclosed vehicles, TC assemblies, and methods, the TC housing may be a bipartite construction fabricated with a pump cover, which circumscribes the impeller, and a turbine cover, which circumscribes the turbine and is rigidly mounted to the pump cover. The mechanical pump may be mounted onto an outer surface of the pump cover and/or the turbine cover. The disconnect clutch may include a disconnect clutch (DC) flange that projects, e.g., radially outward, from the impeller shell. The DC flange includes a DC friction surface that friction-locks to the TC housing. In a more specific example, a DC clutch disc pack (stacked DC pressure discs) projects from an inner surface of the pump cover; the DC friction surface includes a DC clutch plate pack (stacked DC friction plates) that is interleaved with and selectively locks to the DC clutch disc pack. As yet a further option, the lockup clutch includes a TCC hub that is slidably mounted onto the TC output member to rotate in unison therewith. The TCC hub includes a TCC friction surface that friction-locks to the TC housing. In a more specific example, a TCC clutch disc pack (stacked TCC pressure discs) projects axially from an inner surface of the turbine cover; the TCC friction surface includes a TCC clutch plate pack (stacked TCC friction plates) that is interleaved with and locks to the TCC clutch disc pack.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
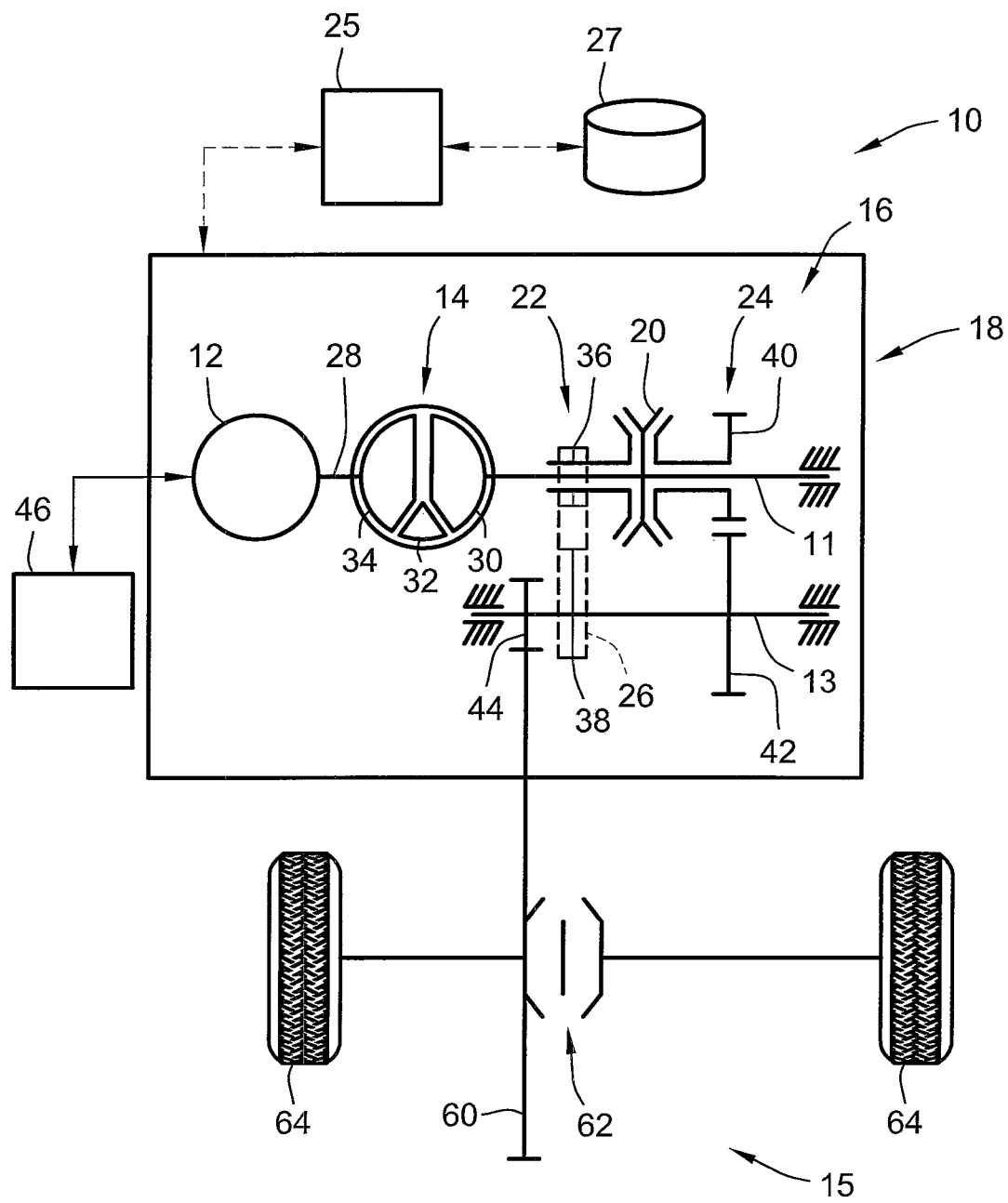
FIG. 1 is a schematic illustration of a representative electric-drive vehicle with a full-electric powertrain having a motor/generator unit drivingly connected to a multi-gear power transmission via a hydrodynamic torque converter in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a transverse-mount, EDU-propelled FEV powertrain. The illustrated automobile 10—also referred to herein as "motor vehicle" or "vehicle" for short—is merely an exemplary application with which aspects of this disclosure may be practiced. In the same vein, utilization of the present concepts for an all-electric vehicle powertrain should also be appreciated as a non-limiting implementation of disclosed features. As such, it will be understood that aspects and features of this disclosure may be applied to other powertrain architectures, may be implemented for any logically relevant type of vehicle, and may be utilized for automotive and non-automotive applications alike. Moreover, only select components of the motor vehicles, electrified powertrains, and torque converter assemblies are shown and described in additional detail herein. Nevertheless, the vehicles, powertrains, and TC assemblies discussed below may include numerous additional and alternative features, and other available peripheral components, for carrying out the various methods and functions of this disclosure.

The FEV powertrain of FIG. 1 employs an electric motor/generator unit 12 that is drivingly connected via a hydrodynamic torque converter 14 to a multi-gear power transmission 16, all of which may be packaged as a self-contained, modular electric drive unit 18, e.g., with integrated electronics package and thermal management system. In accord with the illustrated example, the transmission 16 is generally composed of first and second parallel shafts 11 and 13, respectively, a gear-shifting synchronizer 20 on the first shaft 11, first and second coplanar gear sets 22 and 24, respectively, drivingly connecting the first and second shafts 11, 13, and a torque-transmitting transfer member 26 on the first gear set 22. It should be appreciated that the transmission 16 of FIG. 1 is purely representative in nature and may optionally take on other suitable configurations, including multi-speed automatic transmissions, Continuously Variable Transmission (CVT) architectures, automated-manual transmissions, epicyclic gear arrangements, etc.

For vehicle propulsion, the motor/generator unit 12 may be in the nature of an electric traction motor that outputs tractive torque through a rotor 28 (also referred to herein as "motor output member") by converting stored electrical power into rotational mechanical force. The MGU 12 may be directly coupled onto a TC input member or drivingly mounted to a housing portion of the torque converter 14 and, through the TC, drivingly connected to an input shaft or member of the transmission 16. While shown as an all-electric architecture with a single motor in serial power-flow communication with a single vehicle axle, the vehicle 10 may employ other powertrain configurations, including P1 and P2 hybrid powertrains, as well as other FEV and standard powertrain architectures. In this regard, the MGU 12 may be replaced by other types of prime movers for the powertrain of vehicle 10 without departing from the present disclosure. For example, an internal combustion engine assembly may be employed, in addition to or as a substitute for one or more MGUs, to provide torque to the vehicle's final driveline 15.

The electric motor/generator unit 12 may be an induction-type squirrel cage motor or a permanent-magnet (PM) type asynchronous motor composed of an annular stator (not shown) circumscribing and concentric with the rotor 28. Electric power may be provided to the stator through electrical conductors or cables that pass through the motor housing in suitable sealing and insulating feedthroughs (not illustrated). Conversely, electric power may be provided from the MGU 12 to an onboard traction battery pack or similarly suitable electric vehicle battery (EVB) 46, e.g., through regenerative braking. Operation of any of the illustrated powertrain components may be governed by an onboard or remote vehicle controller, such as programmable electronic control unit (ECU) 25.

Hydrokinetic torque converter assembly 14 operates as a fluid coupling for operatively connecting and disconnecting the motor 12 to and from the internal gearing of the power transmission 16. Disposed within an internal fluid chamber of the TC assembly 14 are a bladed turbine 30, a bladed impeller 34 juxtaposed with the turbine 30, and a bladed stator 32 interposed between and coaxial with the turbine 30 and impeller 34. As shown, the turbine 30 is connectable for common rotation with the first shaft 11 of the transmission 16, whereas the impeller 34 is connectable for common rotation with the rotor 28 of the MGU 12. The stator 32 alters the flow of fluid between the turbine 30 and the impeller 34 such that returning fluid aids, rather than impedes, rotation of the impeller 34. In so doing, the stator 32 provides a mechanism for multiplying the torque transmitted from the turbine 30 to the impeller 34.

With continuing reference to FIG. 1, each of the two coplanar gear sets 22, 24 includes a pair of mated gears. In particular, a first gear 36 of the first coplanar gear set 22 is rotatably supported on and concentric with the first shaft 11. A second gear 38 of the first coplanar gear set 22 is supported on and rotates in unison with the second shaft 13. The transfer member 26 drivingly connects the first gear 36 to the second gear 38 of the first coplanar gear set 22. The transfer member 26 may be a chain, a gear, a belt, or some other element used to maintain the transfer of torque between the first gear 36 and the second gear 38 of the first coplanar gear set 22 while maintaining the same direction of rotation for both gears 36, 38.

A first gear 40 of the second coplanar gear set 24 is also rotatably supported on and concentric with the first shaft 11, whereas a second gear 42 of the second coplanar gear set 24 is supported on and rotates in unison with the second shaft 13. The first and second gears 40, 42 of the second coplanar gear set 24 are intermeshed with each other to transmit torque therebetween. In this manner, the transfer of torque from the first gear 40 to the second gear 42 of the second coplanar gear set 24 occurs with a change in rotational direction between the first and second gears 40, 42. An output gear 44, which is axially spaced from the first and second gear sets 22, 24, is supported on and rotates in unison with the second shaft 13. This output gear 44 meshes with a complementary ring gear 60 of a front or rear differential 62 of the vehicle's final drive system 15. The differential 62 provides a torque pathway to one or more axles and one or more drive wheels 64 of the electric-drive vehicle 10. Although not explicitly portrayed in FIG. 1, it should be appreciated that the final drive system 15 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

The synchronizer 20 may have an inner spline that mates with a complementary spline on the first shaft 11 providing common rotation between the synchronizer 20 and the first shaft 11 while maintaining relative axial movement of the synchronizer 20 on the first shaft 11. In this manner, the synchronizer 20 is selectively relocated between at least three distinct axial positions by sliding the synchronizer 20 on the first shaft 11. When the synchronizer 20 is disposed in a first "neutral" position, for example, the first shaft 11 may rotate freely relative to the first gears 36, 40 of the first and second coplanar gear sets 22, 24. The synchronizer 20 may be slid along the first shaft 11 to a second "forward" position in order to engage for common rotation with the first gear 40 of the second coplanar gear set 24. In this manner, the first gear 40 rotates in unison with both the synchronizer 20 and the first shaft 11.

Continuing with the above discussion of the transmission's 16 different operating modes, the synchronizer 20 may be slid along the first shaft 11 to a third "reverse" position to thereby engage for common rotation with the first gear 36 of the first coplanar gear set 22. Similar to the second position, the third position provides for common rotation between the first gear 36 of the first coplanar gear set 22 and the first shaft 11. However, since the first gear 36 is coupled to the second gear 38 through the transfer member 26 and not via meshing gears, the second gear 38 and, thus, the second shaft 13, the output gear 44, and differential 62 rotate in reverse. In this manner, a reverse gear ratio is achieved which maintains the same rotation direction of the MGU 12. The resulting transmission 16 architecture allows the EDU 18 to utilize the torque multiplication of the torque converter 14 while providing a reverse direction on the drive wheels 64.

Figure 2:
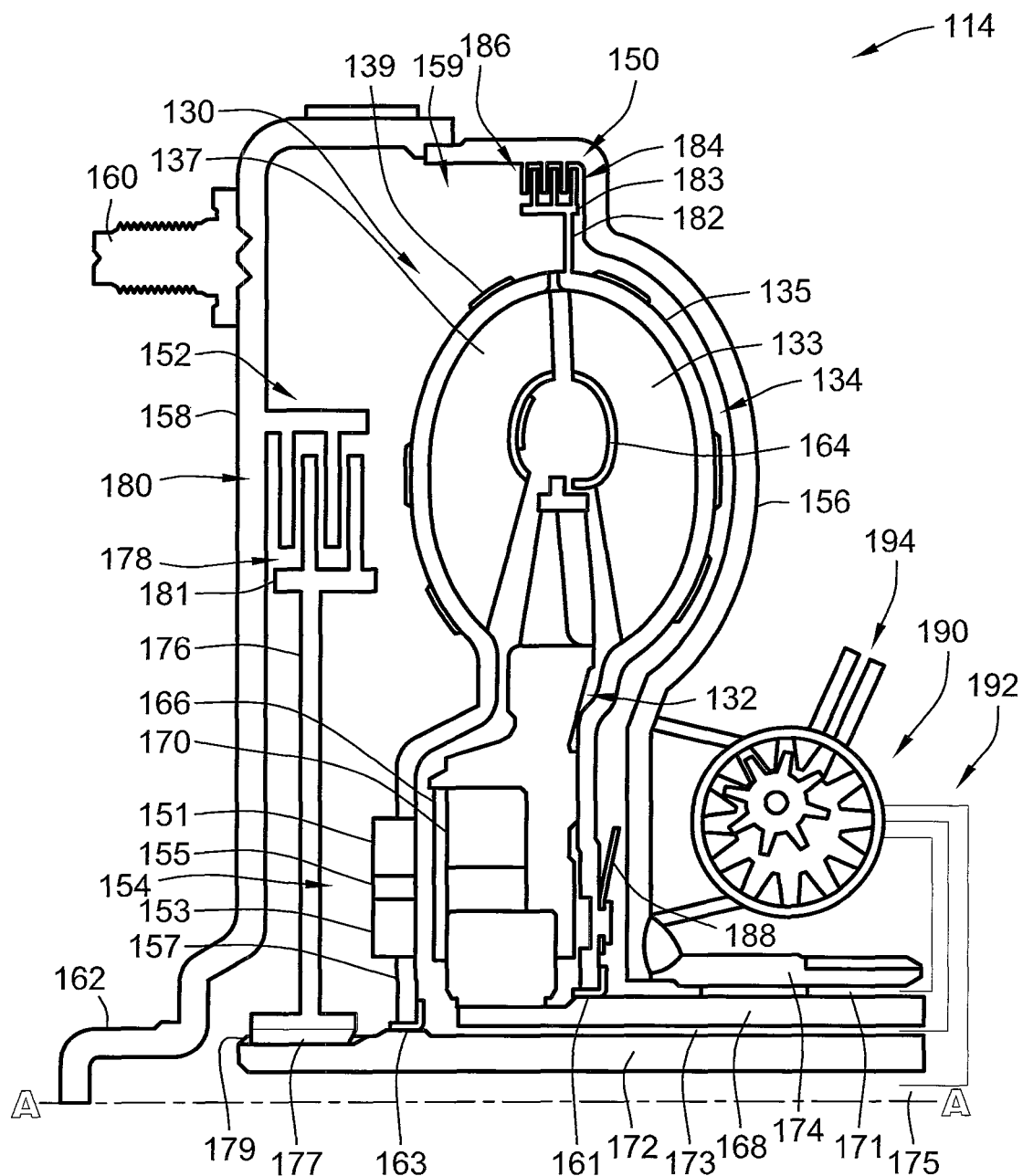
FIG. 2 is a partially schematic, sectional side-view illustration of select portions of a representative hydrodynamic torque converter assembly with a hydraulic control system utilizing a mechanical pump for combined clutch control, converter feed and lubrication in accordance with aspects of the present disclosure.

FIG. 2 is a side-view illustration of an upper half of a representative torque converter assembly 114 that may be adapted for both automotive applications (e.g., for TC 14 of vehicle 10 in FIG. 1) and non-automotive applications (e.g., watercraft, aircraft, and train propulsion, industrial power systems, drilling rigs, etc.). TC assembly 114 of FIG. 2 is taken in cross-section along a vertical plane that passes through the assembly's central axis of rotation A-A (cross-hatching omitted for ease of reference). It should be appreciated that a cross-sectional, side-view illustration of the lower half of the TC assembly 114 may be a near-identical, mirrored image to that shown in FIG. 2. The torque converter 114 is assembled with a motor-driven impeller 134, an impeller-driven turbine 130, a fluid-flow altering stator 132, a pump disconnect clutch (DC) 150 device, a motor-to-transmission lockup clutch 152 device, and a one-way clutch (OWC) 154 device.

To protect the working internal components of the torque converter 114, the assembly is constructed with a fluid-tight, annular housing (also referred to below as "housing 156, 158") that is defined principally by a transmission-side rear pump cover 156 that is fixedly attached, e.g., via electron beam welding, MIG or MAG welding, laser welding, and the like, to a motor-side front turbine cover 158 such that a working hydraulic fluid chamber 159 is formed therebetween. The TC housing's front cover 158 may be drivingly connected to an output member of an electric motor (e.g., rotor 28 of motor 12 in FIG. 1), e.g., via a series of circumferentially spaced lugs 160 or splined engagement with a cylindrical housing hub 162 projecting axially from the center of the front cover 158. Mechanically coupling the front cover 158 to the motor's output member enables the transfer of rotational power back-and-forth between the motor and TC assembly 114.

The impeller 134—also referred to in the art as "pump"—is situated in serial power-flow fluid communication with the turbine 130. Interposed between the impeller 134 and turbine 130 is a bladed stator 132 that selectively alters fluid flow returning from the turbine 130 to the impeller 134 such that returning fluid aids, rather than impedes, rotation of the impeller 134. For instance, TC assembly 114 may be utilized to transfer motor torque from the rotor 28 of MGU 12 to the input shaft 11 of transmission 16 through the manipulation of hydraulic fluid inside the fluid chamber 159. More specifically, rotation of impeller blades 133, which are mounted to a compliant impeller shell 135 located between the pump cover 156 and an inner shroud 164, causes the hydraulic fluid to flow forward and toroidally outward toward the turbine 130. When this occurs with sufficient force to overcome inertial resistance to rotation, turbine blades 137 located in face-to-face relation with the impeller blades 133 will begin to rotate with the impeller 134. These turbine blades 137 are coaxially oriented with the impeller blades 33 and mounted on a compliant turbine shell 139 located between the front cover 158 and the inner shroud 164. The fluid flow exiting the turbine 130 is directed back into the impeller 134 by way of the stator 132. The stator 132—rotatably mounted between the flow exit section of the turbine 130 and the flow entrance section of the impeller 134—redirects the fluid flow from the turbine blades 137 to the impeller blades 133 in the same direction as impeller rotation, thereby reducing pump torque and causing torque multiplication.

Also disposed within the protective outer housing 156, 158 of the torque converter assembly 114 is a thrust bearing 166 that rotatably supports the stator 132. The stator 132 is connected to a hollow stator shaft 168 by way of a roller clutch 170 that is operable to prevent rotation of the stator 132 under calibrated operating conditions. At higher torque converter speeds, for example, the direction of hydraulic fluid leaving the turbine 130 changes, causing the stator 132 to over-run the roller clutch 170 and rotate freely on the stator shaft 168. Projecting axially rearward from the TC housing (to the right in FIG. 2), the stator shaft 168 and a hollow turbine shaft 172 are rotatably encased inside an outer pump hub 174, which may be fluidly sealed to a transmission housing or chamber.

Impeller shell 135 may be bendably or slidably attached, e.g., via splined engagement or mount collar 161, for common rotation on the stator shaft 168. In the same vein, the turbine shell 139 may be bendably or slidably attached, e.g., via splined engagement or mount collar 163, for common rotation on the turbine shaft 172 (also referred to herein as "TC output member"). As shown, the pump hub 174 circumscribes the stator shaft 168 to cooperatively define therebetween a first fluid path 171 through which flows hydraulic fluid for controlled activation of the TC assembly 114. Along the same lines, the stator shaft 168 circumscribes the turbine shaft 172 to cooperatively define therebetween a second fluid path 173 that passes therethrough hydraulic fluid. A longitudinally elongated central cavity of the turbine shaft 172 defines a third fluid path 175. All three hydraulic fluid paths 171, 173, 175 are fluidly connected to a supply of hydraulic fluid, such as a transmission oil sump or EDU sump volume (FIG. 3), and independently modulated to govern operation of the TC assembly 114.

Located inside the working hydraulic fluid chamber 159, interposed between the turbine 130 and turbine cover 158, is a TCC-type lockup clutch 152 that operates to provide a direct driving connection between a prime mover and a torque-modifying transmission (e.g., motor 10 and transmission 16 of FIG. 1). In particular, closing and frictionally locking the lockup clutch 152 will mechanically lock the housing's front cover 158, which couples at the motor output member, to the turbine shaft 172, which couples at the transmission input member. In accord with the illustrated example, the lockup clutch 152 includes a disc-shaped TCC hub 176 that is mounted onto the turbine shaft 172, e.g., via meshing internal and external spline teeth 177 and 179, respectively, for common rotation therewith. Projecting radially outward from an axial flange 181 on the outer perimeter of the TCC hub 176 is a TCC clutch plate pack 178 composed of mutually parallel, axially spaced, and radially aligned friction plates. Projecting axially from an inner surface of the turbine cover 158 is a TCC clutch disc pack 180 composed of mutually parallel, axially spaced, and radially elongated pressure discs that are interleaved with the friction plates of the TCC clutch plate pack 178. Alternatively, the friction plates may be rigidly secured to the turbine cover 158 and the pressure plates may be secured to the lockup clutch 152.

Activation and deactivation of the lockup clutch 152 and associated friction material on the clutch pack 178 plates is achieved via axial sliding and/or fore-aft bending movement of the TCC hub 176 on the turbine shaft 172 in response to modulated hydraulic fluid flow into the fluid chamber 159. In particular, the lockup clutch 152 is activated through increased hydraulic pressure on a rearward face of the TCC hub 176 (rightward facing major surface in FIG. 2), which may be provisioned via inlet fluid flow along the first fluid path 171 between the pump hub 174 and stator shaft 168. On the other hand, lockup clutch 152 deactivation is achieved through increased hydraulic pressure on a forward face of the TCC hub 176 (leftward facing major surface in FIG. 2), which may be provisioned via inlet fluid flow along the third fluid path 175.

When the lockup clutch 152 is closed and locked, i.e., with no slip between the pressure discs in the TCC clutch disc pack 180 and the friction plates in the TCC clutch plate pack 178, the motor 12 effectively circumvents the TC turbine and impeller 130, 134 and transmits power directly to the transmission 16. An optional biasing member, such as a leaf spring (not shown), may be compressed between the inner surface of the front cover 158 and the forward face of the TCC hub 176, pushes the lockup clutch 152 rearwards towards a non-torque-carrying deactivated position (e.g., to the right in FIG. 2). It should be appreciated that the disconnect clutch 150 and lockup clutch 152 may take on other hydraulic clutch configurations, such as dog clutch or single friction surface clutch designs, within the scope of this disclosure.

Integrated into the TC assembly 114 of FIG. 2 is a motor-isolating disconnect clutch device 150 for drivingly connecting and, when desired, disconnecting the electric motor to/from the multi-gear transmission. Similar to the aforementioned lockup clutch 152, the disconnect clutch device 150 of FIG. 2 is embodied as a hydraulically activated friction-type clutch device that is packaged within the fluid chamber 159 of the TC housing 156, 158. As shown, the disconnect clutch device 150 is positioned between the impeller shell 135 and the pump cover 156, providing a direct mechanical interface between the impeller 134 and TC housing 156, 158. Disconnect clutch 152 includes an annular DC flange 182 that is integrally formed with or otherwise attached onto an outer perimeter of the impeller shell 135. The DC flange 182 may be an annular rim that projects radially outward from and extends around the outermost edge of impeller shell 135. To allow fluid from the first fluid path 171 to travel around the impeller 134 and through the disconnect clutch 150, the DC flange 182 may be discontinuous or slotted. A DC clutch plate pack 184 composed of mutually parallel, axially spaced, and radially aligned friction plates projects radially outward from an axial flange 183 on the outer perimeter of the DC flange 182. Projecting radially inward from an inner surface of the pump cover 156 is a DC clutch disc pack 186 composed of mutually parallel, axially spaced, and radially aligned pressure discs that are interleaved with the friction plates of the DC clutch plate pack 184.

Activation and deactivation of the disconnect clutch 150 is achieved via axial sliding and/or fore-aft bending movement of the impeller shell 135 on the stator shaft 168 in response to modulated hydraulic fluid flow into the fluid chamber 159. Similar to the lockup clutch 152, the disconnect clutch 150 is activated through increased hydraulic pressure on a rearward face of the impeller shell 135, which is provisioned via the same inlet fluid flow through the first fluid path 171. On the other hand, disconnect clutch 150 deactivation is achieved through increased hydraulic pressure on a forward face of the impeller shell 135, which is provisioned via inlet fluid flow along the second fluid path 173. When the disconnect clutch 150 is closed and locked, i.e., with no slip between the pressure discs in the DC clutch disc pack 186 and the friction plates in the DC clutch plate pack 184, the motor 12 is drivingly connected to the impeller 134 for rotation in unison therewith. An optional biasing member, such as a leaf spring 188 compressed between the inner surface of the rear cover 156 and the rear face of the impeller shell 135, pushes the disconnect clutch 150 into a torque-carrying activated position (e.g., to the left in FIG. 2).

Continuing with the discussion of the torque converter assembly 114 of FIG. 2, a one-way clutch device 154 is mechanically interposed between the turbine shell 139 and the TC output member 172. This OWC 154 may be a passive-type unidirectional overrunning clutch that functions to automatically operatively connect (or "lock") the turbine shell 139 and, thus, the turbine 130 to the turbine shaft 172. In this manner, the OWC 154 drivingly connects the turbine 130 to the transmission, e.g., when the motor generates positive torque. In the illustrated example, the OWC 154 includes an annular outer race 151 that is concentrically aligned within an annular inner race 153. The outer race 151 is bolted, riveted, welded, and/or integrally formed with (collectively "rigidly attached") a radially inner edge of the turbine shell 139 to rotate in unison therewith. By comparison, the inner race 153 is rigidly attached to an outer periphery of a turbine hub 157 to rotate in unison therewith. It is envisioned that other OWC designs may be implemented, including those with axially spaced, face-to-face races, rather than concentric inner and outer races, as well as active one-way and two-way clutch devices.

Disposed between and selectively rotatably coupling the outer and inner races 151, 153 of the OWC 154 is a series of circumferentially spaced torque transmitting elements 155. These torque transmitting elements 155 may comprise identically shaped and sized spring-biased cylindrical rollers; alternative configurations may incorporate any number, type, and combination of torque transmitting elements, including tapered rollers, needle rollers, sprags, pawls, struts, etc. When disengaged, the torque transmitting elements 155 are in an "unwedged" state to allow overrunning rotational motion of the outer race 151 relative to the inner race 153 in a first (negative) direction. When engaged, the torque transmitting elements 155 are in a "wedged" state to allow unitary rotational motion of the outer race 151 with the inner race 153 in a second (positive) direction. Optional biasing elements (not shown) may press or otherwise "preload" the torque transmitting elements 155 to the wedged position.

To enable combined converter feed, clutch control, and lubrication, a mechanical fluid pump 190 is fluidly coupled to the TC housing and drivingly connected to the electric motor. In accord with the illustrated example, a single fluid pump 190 is mounted within the EDU 18, e.g., adjacent an outer surface of the pump cover 156. It should be appreciated, however, that the fluid pump 190 may be packaged at other discrete locations, both inside and outside the outer casing of the EDU 18 of FIG. 1. Fluid conduits 192, which may be in the nature of fluid pipes, fittings, valves, channels, etc., fluidly couple the fluid pump 190 to the fluid paths 171, 173, 175 inside the TC housing 156, 158. Although illustrated as a gerotor-type positive displacement pump, the fluid pump 190 may take on alternative designs, including screw pumps, reciprocating pumps, and lobe pumps.

The mechanical pump 190 may be packaged in an "on axis" configuration with its rotor shaft coaxially mounted on the same axis of rotation A-A as the TC assembly 14. In this instance, the pump 190 may be directly connected to the pump hub 174 and/or rotor 28 for rotation by the electric motor 12 of FIG. 1, for example. With this architecture, the pump 190 may rotate at the same speed as the motor 12. Comparatively, for an "off axis" configuration, the mechanical pump 190 may be packaged with its rotor shaft mounted on an axis of rotation that is distinct from the axis A-A of the TC assembly 14. An optional pump drive system 194, such as a gear train, chain drive, or belt drive (shown), drivingly connects the pump 190, directly or indirectly, to the hub 174 and/or rotor 28 of the MGU 12 to be powered by the motor 12. With this architecture, the pump 190 may rotate at the same speed as or at a constant ratio to the speed of motor 12. When driven by a motor 12, the fluid pump 190 feeds hydraulic fluid from a fluid sump (FIG. 3), through the pump hub 174, and into the working hydraulic fluid chamber 159 of the TC housing 156, 158. Doing so increases pressure within the fluid chamber 159 so as to: (1) activate the fluid coupling between the turbine 130 and impeller 134; (2) activate the disconnect and lockup clutches 150, 152, as described above; (3) draw thermal energy out of the TC assembly 114; and (4) provide lubrication for the internal working components of the TC assembly 114.

Figure 3:
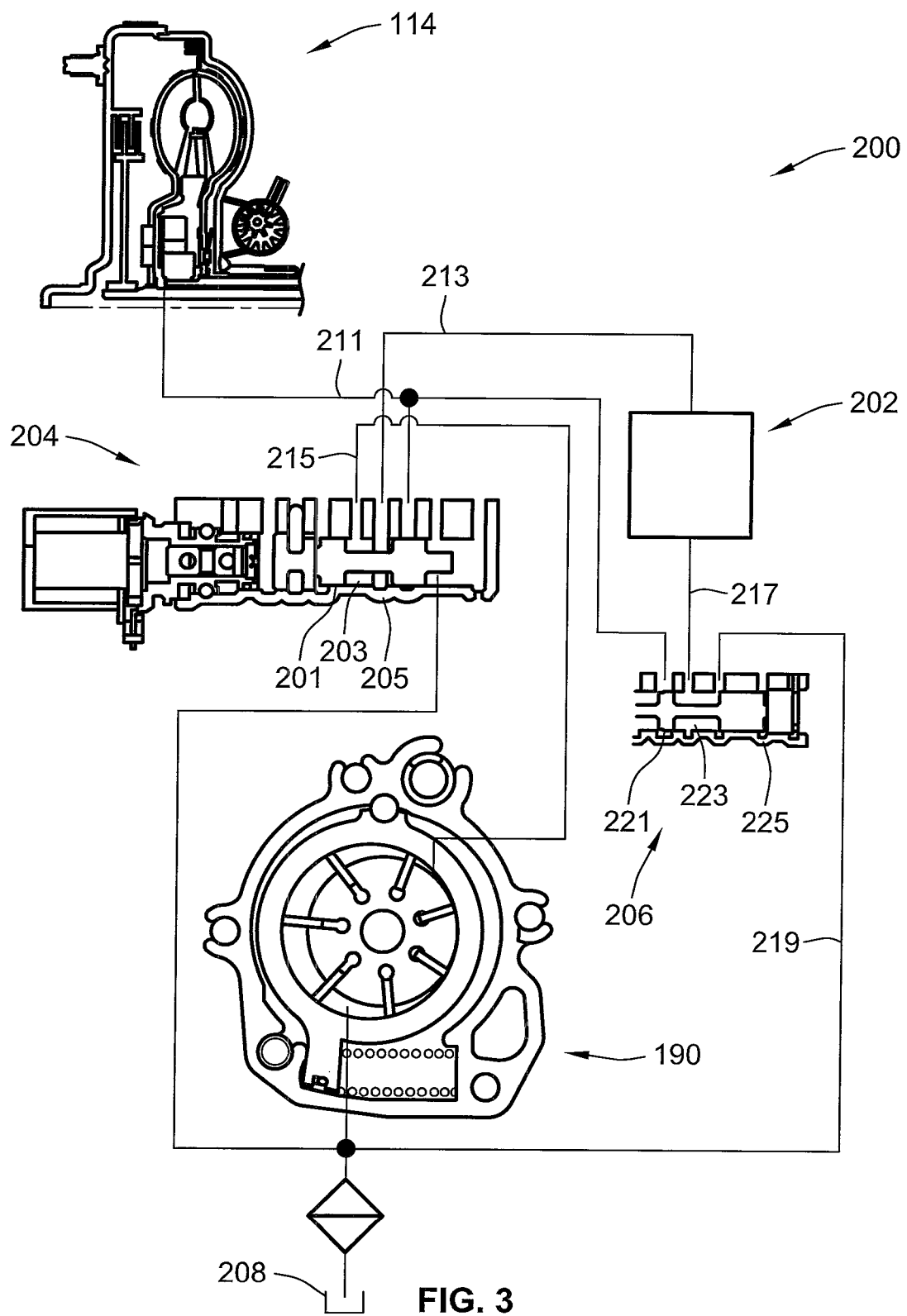
FIG. 3 is a partially schematic, sectional side-view illustration of the representative hydrodynamic torque converter assembly of FIG. 2 shown with a hydraulic control system utilizing an electric pump for selectively draining the mechanical pump for reduced cavity pressure in accordance with aspects of the present disclosure.

With reference next to FIG. 3, the TC assembly 114 of FIG. 2 is shown with an optional hydraulic control system 200 architecture that employs an electric pump 202 for selectively draining fluid from the motor-driven mechanical pump 190 in order to reduce cavity pressure within the TC housing 156, 158 and, thus, allow the TC assembly 114 to operate at high motor speeds (e.g., 9000 RPM and higher). Although differing in appearance, it is envisioned that any of the features and options described above with reference to the torque converter assemblies 14 and 114 of FIGS. 1 and 2 may be incorporated, singly or in any combination, into the TC assembly 114 of FIG. 3, and vice versa. As such, for purposes of succinctness, the overlapping features of FIGS. 1-3 will not be repeated in the description of FIG. 3.

The electric pump 202 in hydraulic control system 200 of FIG. 3 is fluidly connected to a pair of fluid valves 204 and 206; these fluid valves 204 and 206 selectively hydraulically connect the electric pump 202 to the TC's internal fluid chamber 159, the mechanical pump 190, and a fluid sump 208. While not per se required, the first fluid valve 204 may be embodied as a solenoid-actuated torque converter and transmission (TCT) valve assembly, whereas the second fluid valve 206 may be embodied as a spring-biased, hydraulically-actuated line pressure regulator (LPR) valve assembly. The first fluid valve 204 is fluidly coupled to the TC assembly 114 and the second fluid valve 206 via a first feed line 211, to the electric pump 202 via a second feed line 213, and to the mechanical pump 190 via a third feed line 215. In this regard, the second fluid valve 206 is fluidly coupled to the TC assembly 114 via the first feed line 211, to the electric pump 202 via a fourth feed line 217, and to the mechanical pump 190 and the fluid sump 208 via a fifth feed line 219. With this arrangement, both fluid valves 204, 206 are interposed between and, thus, operable to segregate the pump 190 from the TC assembly 114.

The electric pump 202, when fluidly connected via fluid valves 204, 206 to the mechanical pump 190, is operable to drain hydraulic fluid from the pump 190 and divert the drained fluid to the fluid sump 208. For the mechanical pump 190 to feed pressurized fluid to the TC assembly 114, a first valve armature 201 within a first valve body 205 of the first fluid valve 204 shifts to a predefined TC feed position (e.g., rightward in FIG. 4) so as to fluidly connect the first and third feed lines 211, 215 via an internal fluid cavity 203. When in this TC feed position, the first fluid valve 204 simultaneously fluidly connects the first, second and third feed lines 211, 213, 215. To bleed fluid from the mechanical pump 190, the electric pump 202 is fluidly connected to the fluid sump 208 via the second fluid valve 206. In particular, a second valve armature 221 within a second valve body 225 of the second fluid valve 206 shifts to a predefined TC bleed position (e.g., rightward in FIG. 4) so as to fluidly connect the fourth and fifth feed lines 217, 219 via an internal fluid cavity 223. Draining fluid from TC's internal fluid chamber 159 helps to reduce centrifugal pressure inside the TC housing 156, 158 which, in turn, allows the TC assembly 114 to operate at significantly higher speeds. To simplify and/or boost launch control, the electric pump 202 may also be employed as a primary or secondary source for supplying hydraulic fluid from the sump 208 to the TC assembly 114, e.g., via the first, third, fourth and fifth feed lines 211, 215, 217, 219.

Figure 4:
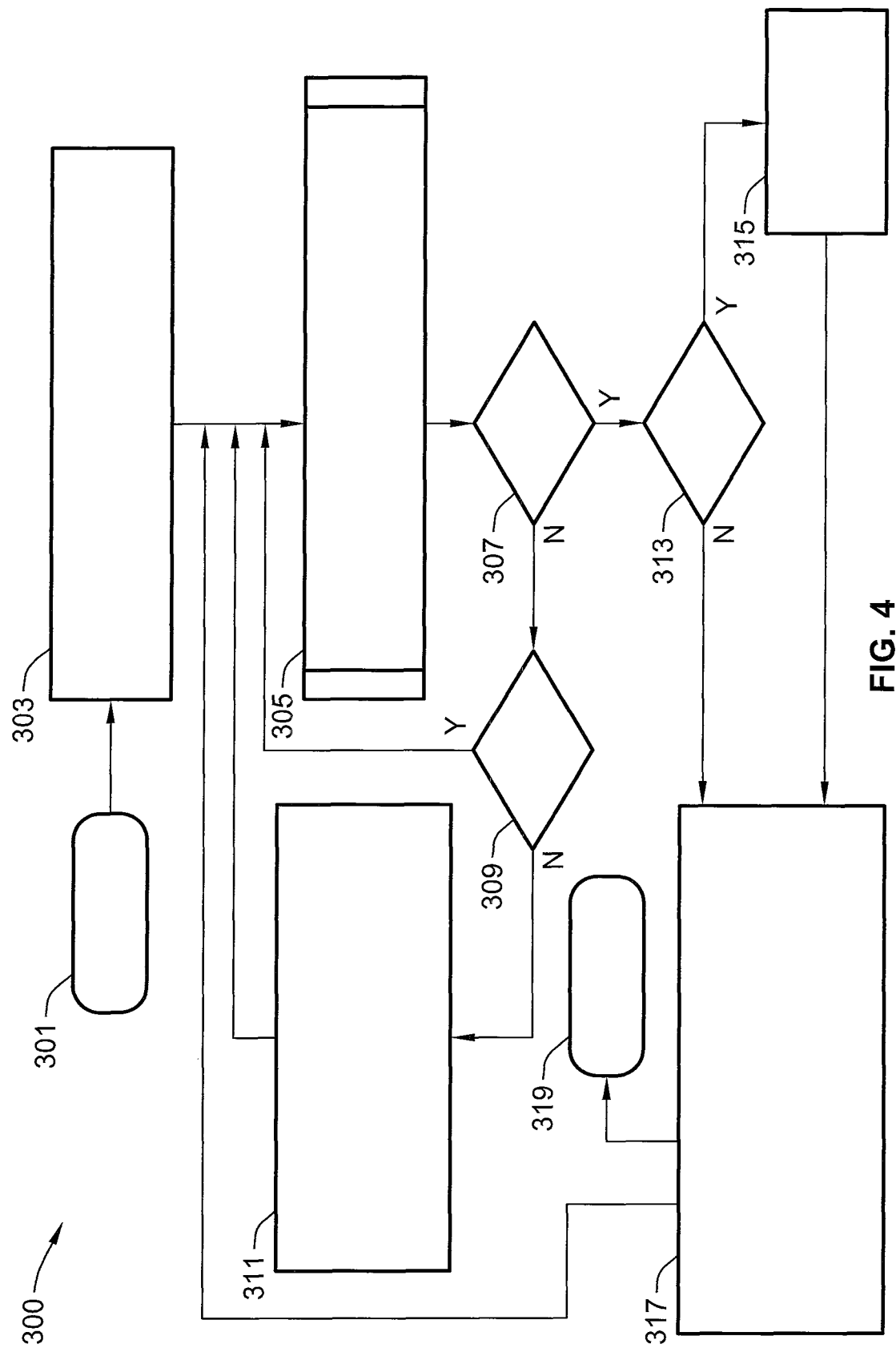
FIG. 4 is a flowchart illustrating a representative hydraulic control protocol for operating a torque converter assembly, which may correspond to memory-stored instructions that are executable by a resident or remote controller, control-logic circuit, programmable control unit, or other integrated circuit (IC) device or network of IC devices in accord with aspects of the disclosed concepts.

With reference next to the flow chart of FIG. 4, an improved method or control strategy for operating a torque converter assembly, such as TC assembly 114 of FIGS. 2 and 3, for launching a motor vehicle, such as automobile 10 of FIG. 1, is generally described at 300 in accordance with aspects of the present disclosure. Some or all of the operations illustrated in FIG. 4, and described in further detail below, may be representative of an algorithm that corresponds to processor-executable instructions that are stored, for example, in main or auxiliary or remote memory (e.g., memory device 27 of FIG. 1), and executed, for example, by an electronic controller, processing unit, logic circuit, or other module or device or network of modules/devices (e.g., ECU 25 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 300 of FIG. 4 begins at START terminal block 301 with memory-stored, processor-executable instructions for a programmable controller or control module or similarly suitable processor to call up an initialization procedure for launch and TCC pressure control. System evaluation for provisioning this routine may be executed in real-time, near real-time, continuously, systematically, sporadically, and/or at regular intervals, for example, each 10 or 100 milliseconds during normal and ongoing operation of the motor vehicle 10. As yet another option, terminal block 301 may initialize responsive to a user command prompt, a resident vehicle controller prompt, or a broadcast prompt signal received from an "off-board" centralized vehicle services system (e.g., a host cloud computing service). As a non-limiting example, an operator of the motor vehicle 10—be it a human or computerized driver—may input a pedal tip-in control command from idle speed or zero speed, e.g., by depression of an accelerator pedal when the pedal has been fully released. Upon completion of the control operations presented in FIG. 4, the method 300 may advance to END terminal block 319 and temporarily terminate or, optionally, may loop back to terminal block 301 and run in a continuous loop.

Upon receipt of the pedal tip-in control command, method 300 responsively advances to DC LOCK/TCC UNLOCK process block 303 and transmits one or more command signals to open the lockup clutch 152 and concurrently close the disconnect clutch 150. By way of non-limiting example, an integrated power electronics (IPE) package of the EDU 18 may contain a powertrain control module (PCM) or a motor controller that transmits system-calibrated control signals to the TC's hydraulic control circuit elements, such as the valves and motors described hereinabove. These signals trigger the control circuit to feed fluid into the working hydraulic fluid chamber 159 in a manner as described above to substantially simultaneously engage the disconnect clutch 150 and disengage the lockup clutch 152 (i.e., TCC opened and DC closed at the exact same time or approximately the same time). While vehicle launch is described above with the TCC unlocked, the vehicle may launch with the TCC either locked or unlocked in an EV application, which is a marked differentiator from ICE-connected TC architectures.

Method 300 continues to CALCULATE predefined process block 305 to determine a predefined minimum pump speed $V'\_p\,(Tq)$ at which the control circuit pump(s) provide sufficient pressure for TC fluid-coupling and clutch control. The minimum pump speed $V'\_p\,(Tq)$ may be calculated in real-time as a function of a drive torque request, e.g., received from an operator of the motor vehicle, to bring the torque converter assembly 114 to capacity and concomitantly close one or both of the clutches 150, 152. Drive torque is related to the torque that is transferred thru the TC clutches and, depending on clutch gain, it dictates how much pressure each clutch needs. This, in turn, drives the pressure the pump needs to supply to operate the TC assembly to meet the drive torque request. In some implementations, the minimum pump speed $V'p\,(Tq)$ may be retrieved from a pump speed schedule, e.g., residing in a memory-stored lookup table, that correlates regulated pressure and associated flow with a linear progression of pump speeds.

After deriving the minimum pump speed $V'\_p\,(Tq)$, method 300 executes decision block 307 to determine if a real-time pump speed $Vp$ is less than the minimum pump speed $V'\_p$ p or, as another option, if a real-time motor speed of the motor is less than a threshold motor speed for achieving the minimum pump speed $V'\_p$. Once again using the configurations of FIGS. 1-3 as representative implementations for the method 300 of FIG. 4, if the current motor speed of the motor 12 is equal to or greater than the threshold motor speed or the current pump speed of the pump 190 is equal to or greater than the minimum pump speed (block 307=NO), the method 300 responsively executes decision block 309 to determine if the lockup clutch 152 is closed/locked. If the TCC-type lockup clutch 152 is locked (block 309=YES), the method 300 responsively loops back to predefined process block 305.

With continuing reference to FIG. 4, the method 300 may automatically respond to the TCC-type lockup clutch 152 not being locked (block 309=NO) by executing a first COORDINATED MOTOR AND TCC CONTROL process block 311. Process block 311 may contain processor executable instructions for a resident controller or control module to coordinate control of the lockup clutch 152 and the electric motor 12 by: (1) governing the motor torque output of the motor 12 to meet the operator-demanded drive torque request; and (2) governing the fluid pressure on the lockup clutch to progressively close the lockup clutch. The latter of the two coordinated control operations may necessitate commanding the current motor speed of the motor 12 to increase to at least the predefined minimum motor speed that will concomitantly increase the current pump speed of the pump 190 to the minimum pump speed that will bring the TC assembly 114 to capacity. Method 300 may thereafter loop from process block 311 back to predefined process block 305.

A positive response from decision block 307 indicating that the current motor speed is less than the threshold motor speed or the current pump speed is less than the minimum pump speed (block 307=YES) causes method 300 to automatically execute decision block 313 to determine if the lockup clutch 152 is closed/locked. If the TCC-type lockup clutch 152 is locked (block 113=YES), the method 300 responsively executes SLIP TCC process block 315 and progressively opens or "slips" the lockup clutch 152 until the slip differential ΔS between the turbine 130 and impeller 134 is substantially equal to a mathematical difference between the predefined minimum pump speed V'$p$ and the current pump speed V$p$  ΔS=V'$p$ –V$p$ Upon completion of process block 315, method 300 advances to a second COORDINATED MOTOR AND TCC CONTROL process block 317.

Method 300 may automatically respond to the TCC-type lockup clutch 152 not being locked (block 309=NO) by executing the second COORDINATED MOTOR AND TCC CONTROL process block 317. Process block 317 may contain processor executable instructions for a resident controller or control module to coordinate control of the lockup clutch 152 and the electric motor 12 by: (1) bringing motor speed up to the minimum motor speed; (3) governing the motor torque output of the motor 12 to meet the operator-demanded drive torque request; and (3) governing the fluid pressure on the lockup clutch to progressively slip the lockup clutch to thereby reduce the slip differential ΔS between the impeller and turbine at a predefined rate, e.g., to maintain an operator or regen torque demand.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A torque converter assembly for drivingly connecting an electric motor to a transmission, the electric motor having an output member, and the transmission having an input member, the torque converter assembly comprising:
    a torque converter (TC) housing defining an internal fluid chamber and configured to drivingly connect to the output member to thereby receive torque generated by the electric motor;
    a TC output member attached to the TC housing and configured to drivingly connect to the input member to thereby transfer torque to the transmission;
    a turbine with turbine blades mounted to a turbine shell, the turbine shell being attached to the TC output member and rotatable within the internal fluid chamber;
    an impeller with impeller blades mounted to an impeller shell, the impeller shell juxtaposed with the turbine shell and rotatable within the internal fluid chamber;
    a lockup clutch disposed inside the internal fluid chamber, between the turbine shell and the TC housing, and operable to lock the TC housing to the TC output member;
    a disconnect clutch disposed inside the internal fluid chamber, between the impeller shell and the TC housing, and operable to lock the TC housing to the impeller;
    a mechanical pump fluidly connected to the TC housing and configured to drivingly connect to the output member to be powered by the electric motor and feed fluid into the TC housing to increase pressure within the internal fluid chamber and activate the lockup and disconnect clutches; and an electronic controller programmed to:
command the lockup clutch to open and the disconnect clutch to close substantially simultaneously with each other;
command the electric motor to increase a motor speed thereof to at least a predefined minimum motor speed calibrated to increase a pump speed of the mechanical pump to a predefined minimum pump speed calibrated to bring the torque converter assembly to capacity;
after the motor speed reaches the predefined minimum motor speed, command the lockup clutch to progressively close to thereby reduce a slip differential between the impeller and the turbine at a predefined rate; and
responsive to a turbine speed of the turbine being substantially equal to the motor speed of the electric motor, command the lockup clutch to close.

2. The torque converter assembly of claim 1, wherein the electric motor and the transmission are part of a powertrain of a motor vehicle, and wherein the electronic controller is further programmed to calculate the predefined minimum pump speed as a function of a drive torque request received from an operator of the motor vehicle.

3. The torque converter assembly of claim 2, wherein the electronic controller is further programmed to:
determine if the motor speed is less than the predefined minimum motor speed;
responsive to the motor speed being less than the predefined minimum motor speed, determine if the lockup clutch is closed; and
responsive to the lockup clutch being closed, slip the lockup clutch until the slip differential between the turbine and the impeller is substantially equal to a mathematical difference between the predefined minimum pump speed and the pump speed.

4. The torque converter assembly of claim 3, wherein the electronic controller is further programmed to:
responsive to the motor speed not being less than the predefined minimum motor speed, determine if the lockup clutch is closed; and
responsive to the lockup clutch not being closed, coordinate control of the lockup clutch and the electric motor by:
controlling a torque output of the electric motor to achieve the drive torque request received from the operator of the motor vehicle; and
controlling a fluid pressure on the lockup clutch to progressively close the lockup clutch.

5. The torque converter assembly of claim 2, wherein commanding the lockup clutch to open and the disconnect clutch to close is responsive to receipt of a pedal tip-in control command from the operator of the motor vehicle.

6. The torque converter assembly of claim 1, further comprising:
an electric pump fluidly connected to a fluid sump, the electric pump being operable to drain fluid from the mechanical pump and divert the drained fluid to the fluid sump; and
an electronic valve fluidly connected to the electric pump and the mechanical pump, the electronic valve being selectively actuable to fluidly connect the electric pump to the mechanical pump such that the electric pump can drain fluid from the mechanical pump.

7. The torque converter assembly of claim 1, further comprising a one-way clutch (OWC) device interposed between the turbine shell and the TC output member, the OWC device including coaxial races and a plurality of torque transmitting elements coupling the coaxial races.

8. The torque converter assembly of claim 1, wherein the disconnect clutch includes a disconnect clutch (DC) flange projecting from the impeller shell, the DC flange including a DC friction surface configured to friction-lock to the TC housing.

9. The torque converter assembly of claim 8, wherein the TC housing includes a pump cover circumscribing the impeller, a turbine cover circumscribing the turbine and rigidly mounted to the pump cover, and a DC clutch disc pack projecting from an inner surface of the pump cover, and wherein the DC friction surface includes a DC clutch plate pack interleaved with the DC clutch disc pack.

10. The torque converter assembly of claim 1, wherein the lockup clutch includes a TC clutch (TCC) hub slidably mounted onto the TC output member to rotate in unison therewith, the TCC hub including a TCC friction surface configured to friction-lock to the TC housing.

11. The torque converter assembly of claim 10, wherein the TC housing includes a pump cover circumscribing the impeller, a turbine cover circumscribing the turbine and rigidly mounted to the pump cover, and a TCC clutch disc pack projecting from an inner surface of the turbine cover, and wherein the TCC friction surface includes a TCC clutch plate pack interleaved with the TCC clutch disc pack.

12. The torque converter assembly of claim 1, further comprising a pump drive system configured to drivingly connect the mechanical pump directly to the output member of the electric motor.

13. A motor vehicle, comprising:
a vehicle body;
a plurality of road wheels attached to the vehicle body;
an electric traction motor attached to the vehicle body and including a rotor configured to output motor torque generated by the electric traction motor;
a transmission attached to the vehicle body and including transmission input and output members, the transmission output member being drivingly connected to one or more of the road wheels to thereby propel the motor vehicle;
a torque converter (TC) assembly operatively connecting the electric traction motor with the transmission, the TC assembly comprising:
a TC housing defining an internal fluid chamber and drivingly connected to the rotor to thereby receive torque generated by the electric traction motor;
a TC output member attached to the TC housing and drivingly connected to the transmission input member to thereby transfer torque to the transmission;
a turbine with turbine blades mounted to a turbine shell, the turbine shell being attached to the TC output member and rotatable within the internal fluid chamber;
an impeller with impeller blades mounted to an impeller shell, the impeller shell juxtaposed with the turbine shell and rotatable within the internal fluid chamber;
a lockup clutch disposed inside the internal fluid chamber, between the turbine shell and the TC housing, and operable to lock the TC housing to the TC output member;
a disconnect clutch disposed inside the internal fluid chamber, between the impeller shell and the TC housing, and operable to lock the TC housing to the impeller; and a mechanical pump fluidly connected to the TC housing and drivingly connected to the rotor to be powered by the electric traction motor and to feed hydraulic fluid into the TC housing to thereby increase pressure within the internal fluid chamber and activate the lockup and disconnect clutches; and an electronic controller programmed to:
command the lockup clutch to open and the disconnect clutch to close substantially simultaneously with each other;
command the electric traction motor to increase a motor speed thereof to at least a predefined minimum motor speed calibrated to increase a pump speed of the mechanical pump to a predefined minimum pump speed calibrated to bring the TC assembly to capacity;
after the motor speed reaches the predefined minimum motor speed, command the lockup clutch to progressively close to thereby reduce a slip differential between the impeller and the turbine at a predefined rate; and
responsive to a turbine speed of the turbine being substantially equal to the motor speed of the electric traction motor, command the lockup clutch to close.

14. A method of assembling a torque converter assembly for drivingly connecting an electric motor with a transmission, the electric motor having an output member, and the transmission having an input member, the method comprising:

receiving a torque converter (TC) housing containing a fluid chamber and configured to drivingly connect to the output member to thereby receive torque generated by the electric motor;
attaching a TC output member to the TC housing, the TC output member being configured to drivingly connect to the input member to thereby transfer torque to the transmission;
rotatably mounting a turbine within the fluid chamber, the turbine including turbine blades mounted to a turbine shell, the turbine shell being attached to the TC output member;
rotatably mounting an impeller within the fluid chamber, the impeller including impeller blades mounted to an impeller shell, the impeller shell juxtaposed with the turbine shell;
locating a lockup clutch inside the fluid chamber, between the turbine shell and the TC housing, the lockup clutch being operable to lock the TC housing to the TC output member;
locating a disconnect clutch inside the fluid chamber, between the impeller shell and the TC housing, the disconnect clutch being operable to lock the TC housing to the impeller;
fluidly connecting a mechanical pump to the TC housing;
drivingly connecting the mechanical pump to the output member to be powered by the electric motor and thereby feed fluid into the TC housing to thereby increase pressure within the fluid chamber and activate the lockup and disconnect clutches; and programming an electronic controller to:
command the lockup clutch to open and the disconnect clutch to close substantially simultaneously with each other;
command the electric motor to increase a motor speed thereof to at least a predefined minimum motor speed calibrated to increase a pump speed of the mechanical pump to a predefined minimum pump speed calibrated to bring the torque converter assembly to capacity;
after the motor speed reaches the predefined minimum motor speed, command the lockup clutch to progressively close to thereby reduce a slip differential between the impeller and the turbine at a predefined rate; and
responsive to a turbine speed of the turbine being substantially equal to the motor speed of the electric motor, command the lockup clutch to close.

15. The method of claim 14, further comprising:
fluidly connecting an electric pump to a fluid sump, the electric pump being operable to drain fluid from the mechanical pump and divert the drained fluid to the fluid sump; and
fluidly connecting an electronic valve to the electric pump and the mechanical pump, the electronic valve being selectively actuable to fluidly connect the electric pump to the mechanical pump such that the electric pump can drain fluid from the mechanical pump.

16. The method of claim 14, further comprising attaching a one-way clutch (OWC) device between the turbine shell and the TC output member, the OWC device including coaxial races and a plurality of torque transmitting elements coupling the coaxial races.

17. The method of claim 14, wherein the disconnect clutch includes a disconnect clutch (DC) flange projecting from the impeller shell, the DC flange including a DC friction surface configured to friction-lock to the TC housing.

18. The method of claim 14, wherein the lockup clutch includes a TC clutch (TCC) hub slidably mounted onto the TC output member to rotate in unison therewith, the TCC hub including a TCC friction surface configured to friction-lock to the TC housing.

19. The method of claim 14, wherein the TC housing includes a pump cover circumscribing the impeller and a turbine cover circumscribing the turbine and rigidly mounted to the pump cover, the mechanical pump mounted onto an outer surface of the pump cover and/or the turbine cover of the TC housing.

20. The method of claim 14, further comprising drivingly connecting the mechanical pump to the output member of the electric motor via a pump drive system.

* * * * *